Aug. 15, 1967  HANS-JOACHIM CONRAD  3,335,640
DEAD CENTER POINT CONTROLLING DEVICE
Filed Dec. 1, 1965  2 Sheets-Sheet 2

Inventor:
Hans-Joachim Conrad

United States Patent Office 3,335,640
Patented Aug. 15, 1967

3,335,640
DEAD CENTER POINT CONTROLLING DEVICE
Hans-Joachim Conrad, Essen-Bredeney, Germany, assignor to Beteiligungs- und Patentverwaltungsgesellschaft mit beschrankter Haftung, Essen, Germany
Filed Dec. 1, 1965, Ser. No. 510,879
9 Claims. (Cl. 91—390)

The present invention relates to a dead center point controlling device for the reciprocatory piston of a reciprocatory piston-equipped displacing device and a rotary piston-equipped displacing device, especially of hydrostatic movement converters, for instance of the general type disclosed in my Patents 3,066,476 and 3,163,090.

With hydrostatic movement converters, a reciprocatory movement is converted into a rotary movement, and vice versa by operatively interconnecting for instance a reciprocatory piston-equipped displacing device fixedly connected to a piston of a piston machine with a rotary piston-equipped displacing device through the intervention of a pressure fluid filled transmission.

With hydrostatic movement converters of the above mentioned type, it is a well-known fact that there exists the possibility of a temporary or permanent shifting of the dead center point of the reciprocable piston-equipped displacing device. Thus disturbances may be caused for instance by leakage in the pressure fluid system, which leakage may occur when pressure fluid passes at the sealing elements between the individual chambers of the reciprocatory piston-equipped displacing device from a chamber under higher pressure to a chamber under lower pressure, e.g. when in a movement converter of the type involved the reciprocable piston-equipped displacing device stands still during a longer period of time and due to leakage losses moves into a certain position in view of its weight. Such leakage losses occur primarily when the movement converter has to transmit high forces and thus high pressures prevail in the movement converter. The volume of the pressure fluid in the transmission system between the reciprocatory piston-equipped displacing device and the rotary piston-equipped displacing device varies also at high pressures in view of the compressibility of the pressure fluid whereby the dead center point of the reciprocatory piston will be dislocated. Furthermore, it has to be taken into consideration that in view of the forces and temperatures occurring in the whole transmission system the walls of this transmission system may deform. Such deformations likewise have a harmful effect upon the dead center point of the reciprocatory machine elements.

In an effort to counter or remedy the above mentioned disturbances, arrangements have been suggested which are intended to assure the position of the upper dead center point of the reciprocatory displacing device. In conformity with these heretofore known arrangements, any necessary correction in the pressure fluid volume is effected directly and in each position within a working stroke of the reciprocatory piston-equipped displacing device. Such arrangements for controlling the volume of the pressure fluid between the reciprocatory and rotary elements are, however, complicated, expensive and easily liable to disturbances.

Based on the consideration that it is primarily important to fix the upper dead center position of the reciprocatory piston-equipped displacing device, it has furthermore been suggested within the range of the dead center position of the reciprocatory piston-equipped displacing device and specifically in the cylinder walls thereof to provide overflow passages which are freed by the reciprocatory piston means when passing the dead center position thereof so that pressure fluid can escape from the transmission system of the movement converter. However, since the reciprocatory piston-equipped displacing device will free such overflow passages for a very short time period only, it is indispensable that a correspondingly large cross section for such passages is available. In addition to these drawbacks, control devices according to this last mentioned suggestion also have the drawback that the movement of the reciprocatory pistons in the upper dead center position thereof can be corrected only when the rated or intended dead center position is passed over by the piston but not when the reciprocatory pistons do not at all reach their rated or intended dead center position.

It is, therefore, an object of the present invention to provide an arrangement controlling the upper dead center point of the reciprocatory piston-equipped displacing device of a hydrostatic movement converter, which will overcome the above mentioned drawbacks.

It is another object of the invention to provide a dead center point controlling device for the reciprocatory piston-equipped displacing device of a hydrostatic movement converter which will permit correcting the upper dead center position of the reciprocatory piston-equipped displacing device when the latter does not reach its rated or intended upper dead center position.

Still another object of this invention consists in the provision of a dead center point controlling device as set forth in the preceding paragraphs which will permit taking advantage of the entire period of a working cycle for correcting the pressure fluid volume to thereby make the dead center point controlling device more sensitive.

These and other objects and advantages of the invention will appear more clearly from the following specification in connection with the accompanying drawings, in which.

Figure 1:
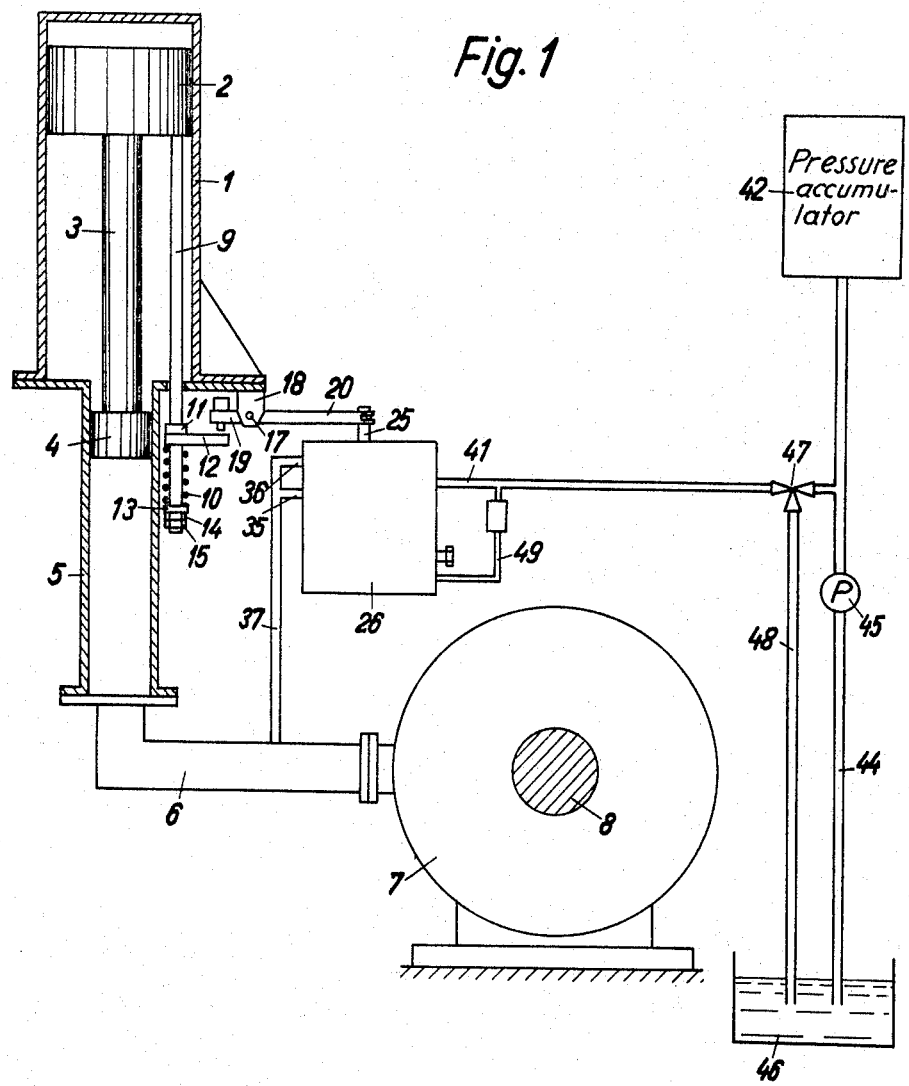
FIG. 1 is a diagrammatic illustration of a converter according to the present invention.

The dead center point controlling device according to the present invention is characterized primarily in that the reciprocatory piston-equipped displacing device has an abutment which within the range of its upper dead center position cooperates with a feeler adapted to control a valve which in its turn controls the flow of pressure fluid into and from the pressure chamber means of the movement converter. The present invention starts with the consideration that it is not necessary to control the coordination of the piston of the reciprocatory piston-equipped displacing device (henceforth called reciprocatory device) to the rotary piston of the rotary piston-equipped displacing device (henceforth called rotary device) over the entire stroke because the influential factors which change the volume of the pressure fluid conveying the forces between the reciprocatory device and the rotary device are the same during each stroke. It has proved sufficient, for instance with internal combustion engines or compressors with a hydrostatic transmission, to feel the position of the reciprocatory device in the upper dead center point thereof which has to be precisely maintained, and when said dead center position is not reached or passed by to correct the volume of the pressure fluid medium.

In contrast to heretofore known dead center point controlling devices, the arrangement according to the present invention makes it possible to correct the volume of the pressure fluid also when the dead center position of the reciprocatory piston means is not reached. In such an instance, according to the present invention, additional pressure fluid is introduced into the transmission system. The feeler which, within the range of the upper dead center position of the reciprocatory piston means cooperates with the abutment of the reciprocatory device, may according to a particularly simple embodiment of the present invention consist of a two-arm lever which is pivotally connected to the cylinder of the reciprocatory device while one lever arm of said two-arm lever is provided with a pressure member cooperating with the abutment of the reciprocatory piston means. The other lever arm of said two-arm lever is in cooperation with the valve which controls the flow of pressure fluid into and from the pressure chambers of the movement converter. In this connection, it is of particular advantage when the pressure member of the feeler is during the operation adjustable in the direction of movement of the reciprocatory device. Such adjustability makes it particularly simple to influence at random the dead center position of the reciprocatory device during the operation thereof. The abutment connected to the reciprocatory device, which abutment may, for instance, consist of an abutment which is rigidly connected with the reciprocatory device, is advantageously provided with a coat of hard but elastic material such as hard rubber whereby the shocks occurring between abutment and feeler will be cushioned and corresponding noises will be avoided.

Referring now to the drawing in detail, the arrangement shown therein comprises a cylinder 1 for instance of an internal combustion engine having reciprocably mounted therein a piston 2 which in its turn through a connecting rod 3 is connected with a reciprocatory displacement piston 4 of the hydrostatic transmission, displacement piston 4 being reciprocable in a displacement cylinder 5. Cylinder 5 communicates through a conduit 6 with the pressure chambers of the rotary device 7 of the hydrostatic transmission having an output shaft 8.

Figure 2:
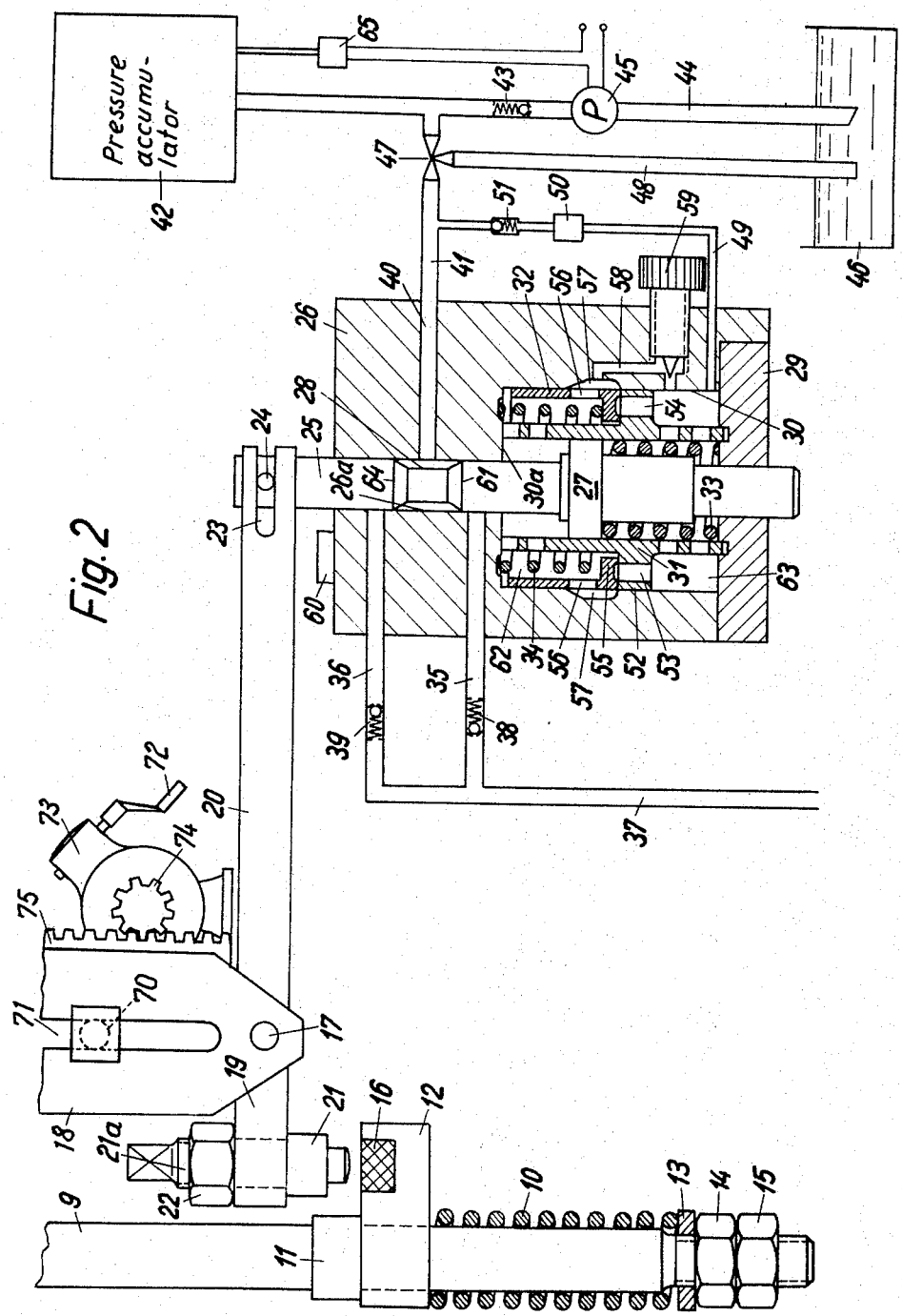
FIG. 2 represents a diagrammatic illustration of a dead center point controlling device according to the present invention.

Piston 2 has connected thereto a rod 9 provided with an abutment which consists of a cam 12 arranged below an extension or collar 11 and pressed there against by one end of a spring 10 the other end of which rests against a spring dish 13 secured on rod 9 by means of a nut 14 and counter nut 15. Cam 12 provided with an insert 16 (FIG. 2) of hard but elastic material such as hard rubber cooperates within the range of the upper dead center position of displacement piston 4 with a two-arm lever 19, 20 which is pivotally supported by a bolt 17 in a support 18, which, for example is vertically guided by means of bolts 70 fixed to the cylinder 1 and engaging a vertical slot 71 of the support 18. The latter can be raised and lowered by means of a crank 72, an automatic stopping worm gear 73, a pinion 74 and a gear each 75 fixed to the support 18. The shorter lever arm 19 of said two-arm lever is provided with a pressure member 21 which is adjustable on the thread of bolt 21a and is held in its respective position by a counter nut 22 (FIG. 2).

The longer lever arm 20 is provided with an oblong or fork-shaped cutout 23 which slidably engages a pin 24 by means of which a valve spool 25 is linked to the longer lever arm 20. Valve spool 25 is slidably movable in a vertical bore 26a of a control block 26 and is furthermore provided with a piston section 27 and an annular groove 28. Control block 26 is closed by a cover 29 and has a cylindrical bore 30 with a bushing 31 therein in which piston 27 of valve spool 25 is reciprocably mounted. The arrangement furthermore comprises a check valve 32 surrounding bushing 31. Valve spool 25 rests on cover 29 through the intervention of piston 27 and a pressure spring 33. Check valve 32 cooperates with a spring 34 which rests on the bottom 30a of bore 30.

Control block 26 has arranged therein conduit means 35 and 36 communicating with a conduit 37 which in its turn communicates with the conduit 6 (see FIG. 1) and thus with the pressure chambers of the hydrostatic transmission. Conduit 35 has interposed therein a check valve 38 which permits a flow only in the direction from conduit 37 to control block 26. Similarly, conduit 36 has interposed therein a check valve 39 which, however, permits a flow of fluid only in the direction from control block 26 to conduit 37.

Control block 26 is furthermore provided with a conduit 40 which communicates through a conduit 41 with a pressure accumulator 42 and also communicates with a conduit 44 having interposed therein a check valve 43 and a pump 45. Check valve 43 opens only in the direction toward the pressure accumulator. Conduit 44 leads to a pressure fluid reservoir 46. As pressure medium in the accumulator 42 and reservoir 46 oil may be employed. Conduit 41 has interposed therein pre-controlled pressure relief valve 47 which through a conduit 48 communicates with the fluid reservoir 46. Furthermore, conduit 41 communicates through a conduit 49 with bore 30 provided in control block 26 and closed off toward the outside by cover 29. Conduit 49 has interposed therein a fine filter 50 and a check valve 51 which permits a flow of fluid only in the direction from conduit 41 to bore 30.

Bushing 31 in control block 26 has a flange-like radial extension 52 by means of which bushing 31 slidably engages the inner wall of bore 30. Flange 52 is provided with bores 53 and 54 adapted to be closed or relieved by the bottom 55 of valve member 32. Valve member 32 is provided with bores 56 which lead into an annular passage 57 provided in the wall of bore 30. Annular passage 57 communicates through a conduit 58 which bore 30 and its effective cross section may be varied by a throttle screw 59.

Control block 26 carries an abutment 60 for abutment with the longer lever arm 20 of the two-arm lever 19, 20, when the upper rated dead center point position of piston 2 is exceeded to a certain extent. When lever arm 20 engages abutment 60, cam 12 is against the thrust of pressure spring 10 displaced in the longitudinal direction of bar 9 without the hydraulic part of the control device being further actuated.

*Operation*

The control arrangement shown in the drawing operates as follows:

When piston 2 during its upward movement exceeds its adjusted or intended or rated dead center point position, cam 12 engages pressure member 21 and through the intervention of the latter acts upon the shorter lever arm 19 so that the latter is tilted upwardly while the longer lever arm 20 acts upon pin 24 of valve spool 25 so as to move the latter downwardly in its vertical bore 26a. When the deviation in upward direction of the rated dead center point position of piston 2 has become so great that a correction must be effected, control edge 61 of the annular groove 28 in the valve spool 25 passes in downward direction beyond conduit 35 in control block 26. As a result thereof, conduit 35 now connects through annular groove 28, the control conduit 40 and conduit 41 with the pressure accumulator 42. As long as the pressure in conduit 6 which interconnects the pressure chambers of rotary device 7 of the hydrostatic transmission and cylinder 5 is greater than the pressure prevailing in accumulator 42, pressure fluid will from the pressure chambers of the hydrostatic transmission pass through check valve 38 to the pressure accumulator 42. By suitably dimensioning the cross sections of annular groove 28 in valve spool 25 and of conduits 35 and 36, it is possible to assure that during the return movement of valve spool 25 which is delayed by the delaying device of the control arrangement, not too much oil will flow from the pressure system of the hydrostatic transmission into the accumulator 42. Pressure fluid can flow to the pressure accumulator as long as the pressure in the pressure fluid system exceeds the pressure prevailing in the pressure accumulator 42. Thus, for instance, the pressure in the pressure accumulator may be so selected that half the working cycle of piston 2 will be available for the outflow of pressure fluid to the pressure accumulator 42. The pressure of the pressure fluid accumulator 42 should be held at a value between the maximum and the minimum pressure in the pressure fluid system of the hydrostatic transmission so that at the same positive or negative deviation of piston 2 from its rated dead center position, the same quantities of pressure fluid will be introduced or withdrawn during a working cycle. The withdrawal is effected as long as the pressure in the pressure fluid system is less than in the pressure accumulator. The supply of pressure fluid is effected as long as the pressure during the same working cycle is greater than the pressure in the accumulator 42. When the working conditions change, the pressure of the accumulator 42 may be varied accordingly.

With further reference to FIG. 2, it will be noted that in bore 30 of control block 26, chambers 62, 63 respectively located above and below piston 27 of valve spool 25 are formed which are filled with pressure fluid. These chambers 62, 63 are confined by the bottom of the bore 30, lid 29 and flange 52, bushing 31, bottom 55 of check valve 32 and the outer walls of bore 30. These chambers 62, 63 communicate through annular chamber 57 and conduit 49 with the fine filter 50 and through check valve 51 with the pressure accumulator 42. Pressure spring 33 is adapted to move piston 27 and thus valve spool 25 upwardly. In such an instance, pin 24 tilts lever arm 20 upwardly while the shorter lever arm 19 with the pressure member 21 is moved downwardly. When piston 2 has reached its rated upper dead center point, cam 12 cooperates with pressure member 21. Valve spool 25 will then be returned to its normal position if it should have exceeded the same.

When piston 2 for some reason moves beyond its upper dead center position to such an extent that a correction is necessary, pressure member 21 will with shorter lever arm 19 move upwardly and long lever arm 20 together with valve spool 25 will be moved downwardly to such an extent that control edge 61 of annular groove 28 frees conduit 35. As a result thereof, conduit 6 which interconnects the pressure chambers of the hydrostatic transmission will be connected with pressure accumulator 42. Pressure fluid can then flow from conduit 6 through conduit 37, check valve 38, conduit 35, annular groove 28, conduit 40 and conduit 41 to the accumulator 42. This process will last as long as the pressure in the pressure chambers of the hydrostatic transmission and thus in conduit 6 is greater than the pressure adjusted for the pressure accumulator 42. By suitably dimensioning the effective cross section of passage 58 which is variable by throttle screw 59, the return operation can be so influenced that not too much but also not too little of the pressure fluid will pass from the pressure chambers of the hydrostatic transmission into the accumulator 42.

If piston 2 does not reach its adjusted upper rated dead center point position, control spool 25 will by pressure spring 33 move upwardly to such an extent that control edge 64 of annular groove 28 of valve spool 25 will move beyond conduit 36 whereby conduit 36 will be connected to conduit 40 through intervention of annular groove 28. As long as the pressure in the pressure accumulator 42 exceeds the pressure in the pressure chambers of the hydrostatic transmission, pressure fluid will pass from accumulator 42 through conduit 41, conduit 40, annular groove 28, conduit 36 and conduit 37 to conduit 6 and thus to the pressure chambers of the hydrostatic transmission. When the pressure in the pressure accumulator 42 is so adjusted that when piston 2 exceeds its rated upper dead center position for the return flow of pressure fluid from the pressure chambers of the hydrostatic transmission to accumulator 42, half a working cycle of piston 2 is available, the return flow of the pressure fluid from accumluator 42 into the pressure chambers of the hydrostatic transmission may likewise be effected during half a working cycle of piston 2. Thus, when employing the above mentioned control arrangement, the entire working cycle is available for the correction of the synchronism of the hydrostatic transmission. In other words, the arrangement according to the present invention makes it possible for the correction of the volume of the pressure fluid medium in the transmission system between the reciprocatory device and the rotary device to make use of the entire period of a working cycle even though the control device is affected by the reciprocatory device only within the range of the dead center position. In this way, it is possible to get along with relatively narrow pressure fluid conduits and overflow openings while nevertheless obtaining the necessary sensitivity for the control. When the pressure in accumulator 42 drops below a certain value, pump 45 will be started by a pressure switch 65 and will pump oil from the reservoir 46 into the accumulator 42 until the required pressure has been built up. Pump 45 thus has to become active only prior to the hydrostatic transmission being taken into operation, and then only when pressure fluid from the pressure chambers of the hydrostatic transmission is lost toward the outside and the pressure in accumulator 42 drops too strongly in view of the required post-feeding The pre-controlled relief valve 47 is advantageously so designed that it interrupts the connection between accumulator 42 and conduits 41, 49 when the hydrostatic transmission is put out of operation. Otherwise, due to the lowering of the short lever arm 19 with the pressure member 21, pressure fluid would continuously pass from the accumulator 42 into the pressure chambers of the hydrostatic transmission. Relief valve 47 may, however, also be so designed that during the standstill of the hydrostatic transmission, it will establish communication between conduit 41 and reservoir 46. When during the standstill of the hydrostatic transmission too much pressure fluid has passed into the pressure chambers of the hydrostatic transmission, it is possible when putting the hydrostatic transmission into operation, during the first small turning during the exceeding of the upper rated dead center position by piston 2, to feed pressure fluid from the pressure chambers of the hydrostatic transmission into the oil reservoir 46.

As will be evident from the present invention has above all the advantage of high safety because auxiliary means such as electric control devices or compressed air operable contol arrangements are not required, and the valve which controls the flow of pressure fluid to and from the pressure fluid system is actuated directly by the reciprocatory device when the dead center point is exceeded.

A particular sensitive control may furthermore be obtained by following the first control arrangement by a second or more control arrangements which will become effective when the deviations of the reciprocatory device from the rated dead center position becomes so great that the proceding control arrangement can no longer correct the same. In such a counter arrangement comprising a plurality of stages, the first stage serves for a fine control which will suffice in general. By greater errors within the transmission, which could be caused, for instance, by a failure of the sealing elements, there will exist the posibility that the deviations of the reciprocatory device from the rated dead center position exceeds the capacity of the first stage. In such an instance, the second stage or subsequent stages may become effective.

If with still greater deviations of the reciprocatory piston from the dead center position, the control arrangement can no longer follow so that a safe operation of the hydrstatic transmission is no longer assured, the reciprocatory device may, for instance, by a further special abutment actuate a safety valve which will cause pressure fluid to flow from the pressure fluid system whereby the reciprocatory device is separated from the rotary device.

It is, of couse, to be understood that the present invention is, by no means, limited to the particular arrangements shown in the drawings but also comprises any modifications within the scope of the appended claims.

What I claim is:

1. In combination with a hydrostatic movement converter comprising a reciprocable piston equipped displacing device, and a rotary piston equipped displacing device, and also comprising main conduit means establishing hydraulic communication between said rotary piston equipped displacing device and said reciprocable piston equipped displacing device, an arrangement for controlling a desired dead center position of the piston of said reciprocable piston equipped displacing device, which includes: a master valve having a valve box with a valve bore therein and also with a feed-in conduit and a feed-out conduit communicating with said valve bore and with said main conduit and respectively having interposed therein a first check valve and a second check valve, said check valves being effective in an opposite sense with regard to each other, a pressure accumulator, additional conduit means provided in said valve box and communicating with said valve bore and said pressure accumulator, a valve body adjustable in said valve bore and movable from a neutral position in which it interrupts communication between said pressure accumulator and both of said feed-in and feed-out conduits into a first control position and a second control position for establishing communication between said pressure accumulator and said rotary piston equipped device through said feed-out and said feed-in conduits respectively to respectively establish pressure fluid flow from said rotary piston equipped displacing device to said pressure accumulator and from the latter to said rotary piston equipped displacing device, setting means continuously urging said valve body into said second control position for establishing presusre fluid flow from said accumulator to said rotary piston equipped device, and feeler means operatively connected to said reciprocable piston equipped displacing device and including means operable in response to the piston of said reciprocable piston equipped displacing device exceeding said desired dead center position by a certain distance to move said valve body into said first control position to establish fluid flow from said rotary piston equipped displacing device through said feed-in conduit to said pressure accumulator.

2. An arrangement according to claim 1, which includes slow-down means operatively connected to said valve body for slowing down a movement of said valve body as caused by said setting means.

3. An arrangement according to claim 1, in which said valve body includes piston means, and in which said master valve also includes adjustable dashpot means operatively connected to said piston means for slowing down movement of said valve body in the direction of the thrust of said setting means.

4. In combination with a hydrostatic movement converter comprising a reciprocable piston equipped displacing device and a rotary piston equipped displacing device, and also comprising main conduit means establishing hydraulic communication between said rotary piston equipped displacing device and said reciprocable piston equipped displacing device, an arrangement for controlling a desired dead center position of the piston of said reciprocable piston equipped displacing device, which includes: a master valve having a valve box with a valve bore therein and also with a feed-in conduit and a feed-out conduit communicating with said valve bore and with said main conduit and respectively having interposed therein a first check valve and a second check valve, said check valves being effective in an opposite sense with regard to each other, a pressure accumulator, additional conduit means provided in said valve box and communicating with said valve bore and said pressure accumulator, a valve body reciprocable in said valve bore and movable from a neutral position in which it interrupts communication between said pressure accumulator and both of said feed-in and feed-out conduits into a first control position and a second control position for establishing communication between said pressure accumulator and said rotary piston equipped device through said feed-out and said feed-in conduits respectively to respectively establish pressure fluid flow from said rotary piston equipped displacing device to said pressure accumulator and from the latter to said rotary piston equipped displacing device, setting means continuously urging said valve body into said second control position for establishing pressure fluid flow from said accumulator to said rotary piston equipped device, feeler means comprising a first member connected to the piston of said rotary piston equipped device, said feeler means also comprising a second member operatively connected to said valve body and being in the path of said first member when said piston exceeds said desired dead center position, said first member being operable in response to the piston of said reciprocable piston equipped displacing device exceeding said desired dead center position by a certain distance to cause said first member to actuate said second member so as to cause said valve body to move into said first control position for establishing fluid flow from said rotary piston equipped displacing device through said feed-out conduit to said pressure accumulator.

5. An arrangement according to claim 4, which includes means operatively connected to said reciprocable piston equipped displacing device for varying the desired dead center point position of the piston pertaining thereto.

6. An arrangement according to claim 4, in which said second member is adjustable in the direction of movement of said first member for varying the point in which said first member impinges said second member, thus varying the desired dead center point position.

7. In combination with a hydrostatic movement converter comprising a reciprocable piston equipped displacing device and a rotary piston equipped displacing device, and also comprising main conduit means establishing hydraulic communication between said rotary piston equipped displacing device and said reciprocable piston equipped displacing device, an arrangement for controlling a desired dead center position of the piston of said reciprocable piston equipped displacing device, which includes: a master valve having a valve box with a valve bore therein and also with a feed-in conduit and a feed-out conduit communicating with said valve bore and with said main conduit and respectively having interposed therein a first check valve and a second check valve, said check valves being effective in an opposite sense with regard to each other, a pressure accumulator, additional conduit means provided in said valve box and communicating with said valve bore and said pressure accumulator, a valve spool reciprocable in said valve bore and movable from a neutral position in which it interrupts communication between said pressure accumulator and both of said feed-in and feed-out conduits into a first control position and a second control position for establishing communication between said pressure accumulator and said rotary piston equipped device through said feed-in and said feed-out conduits respectively to respectively establish pressure fluid flow from said rotary piston equipped displacing device to said pressure accumulator and from the latter to said rotary piston equipped displacing device, spring means continuously urging said valve spool into said second control position for establishing pressure fluid flow from said accumulator to said rotary piston equipped device, feeler means operatively connected to said reciprocable piston equipped displacing device and including means operable in response to the piston of said reciprocable piston equipped displacing device exceeding said desired dead center position by a certain distance to move said valve spool into said first control position to establish fluid flow from said rotary piston equipped displacing device through said feed-out conduit to said pressure accumulator.

8. In combination with a hydrostatic movement converter comprising a reciprocable piston equipped displacing device, and also comprising main conduit means establishing hydraulic communication between said rotary piston equipped displacing device and said reciprocable piston equipped displacing device, an arrangement for controlling a desired dead center position of the piston of said reciprocable piston equipped displacing device, which includes: a master valve having a valve body with a valve bore therein and also with a feed-in conduit and a feed-out conduit communicating with said valve bore and with said main conduit and respectively having interposed therein a first check valve and a second check valve, said check valves being effective in an opposite sense with regard to each other, a pressure accumulator, additional conduit means provided in said valve body and communicating with said valve bore and said pressure accumulator, a valve spool reciprocable in said valve bore and movable from a neutral position in which it interrupts communication between said pressure accumulator and both of said feed-in and feed-out conduits into a first control position and a second control position for establishing communication between said pressure accumulator and said rotary piston equipped device through said feed-in and said feed-out conduits respectively to respectively establish pressure fluid flow from said rotary piston equipped displacing device to said pressure accumulator and from the latter to said rotary piston equipped displacing device, spring means continuously urging said valve spool into said second control position for establishing pressure fluid flow from said accumulator to said rotary piston equipped device, feeler means operatively connected to said reciprocable piston equipped displacing device and including means operable in response to the piston of said reciprocable piston equipped displacing device exceeding said desired dead center position by a certain distance to move said valve spool into said first control position to establish fluid flow from said rotary piston equipped displacing device through said feed-out conduit to said pressure accumulator, and relief valve means interposed in said additional circuit means and operable in response to said moveemnt converter being stopped to interrupt communication between said additional conduit means and said pressure accumulator.

9. An arrangement according to claim 8, which includes a fluid reservoir and fluid conveying means leading from said reservoir to said relief valve means, said relief valve means being operable when interrupting communication between said additional conduit means and said pressure accumulator to establish fluid communication between said additional conduit means and said fluid reservoir.

No references cited.

EDGAR W. GEOGHEGAN, *Primary Examiner.*